3,344,025
ANTIBIOTIC AP–191–γ AND A PROCESS FOR PRODUCING SAME BY CULTURING STREPTOMYCES CANDIDUS
Howard Arnold Whaley, Monsey, and Ernest Leonard Patterson and Samuel Owen Thomas, Pearl River, N.Y., assignors to American Cyanamid Company, Stamford, Conn., a corporation of Maine
Filed Apr. 13, 1964, Ser. No. 359,061
2 Claims. (Cl. 167—65)

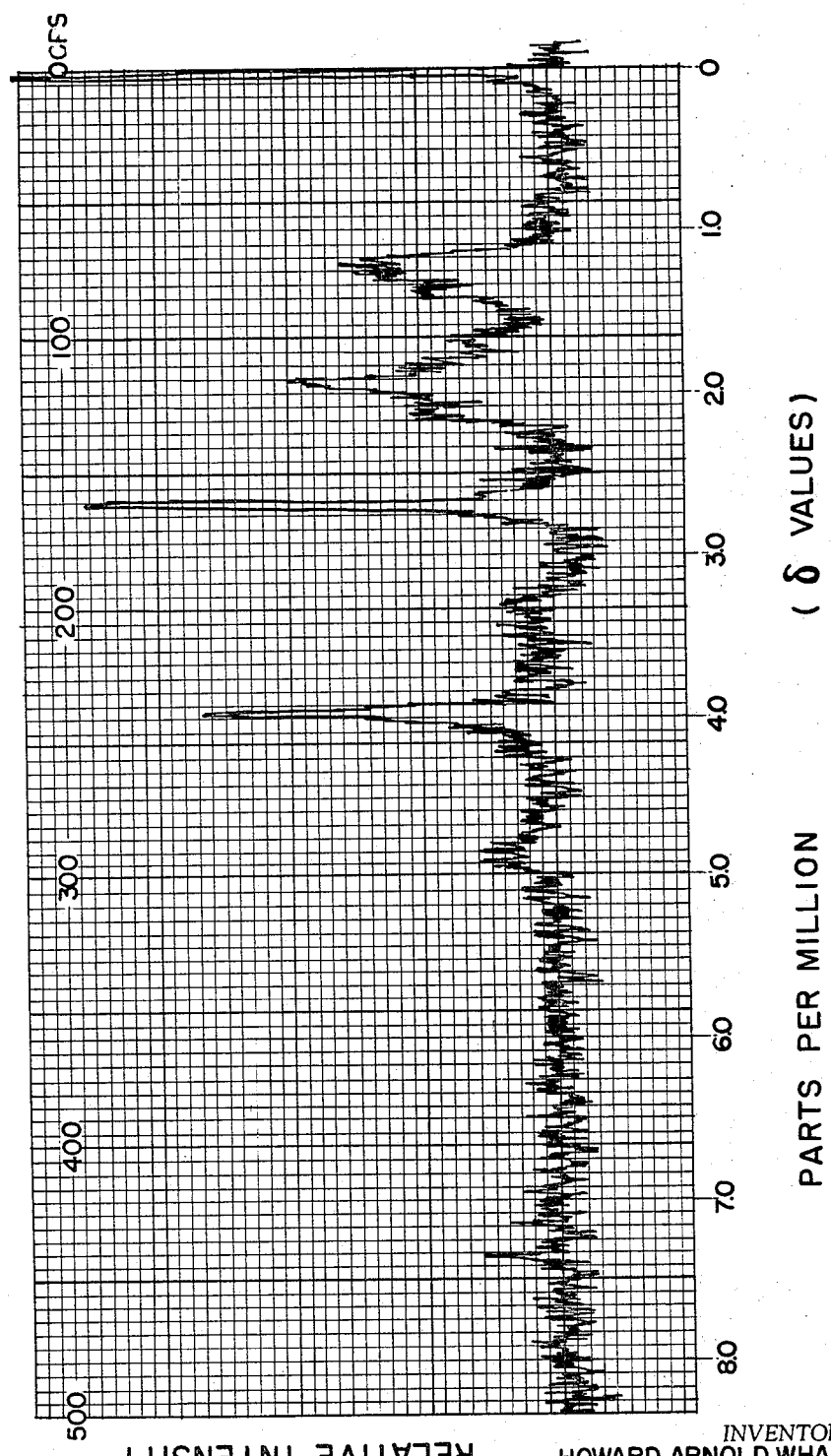

ABSTRACT OF THE DISCLOSURE

This invention is concerned with antibiotic AP–191–γ which is effective in inhibiting the growth of gram-positive and gram-negative bacteria. The new antibiotic is produced by cultivating the microorganism *Streptomyces candidus* NRRL 3110 in an aqueous nutrient medium containing assimilable sources of carbohydrate, nitrogen and inorganic salts under submerged aerobic conditions, and thereafter recovering the antibiotic so-produced.

---

Figure 1:
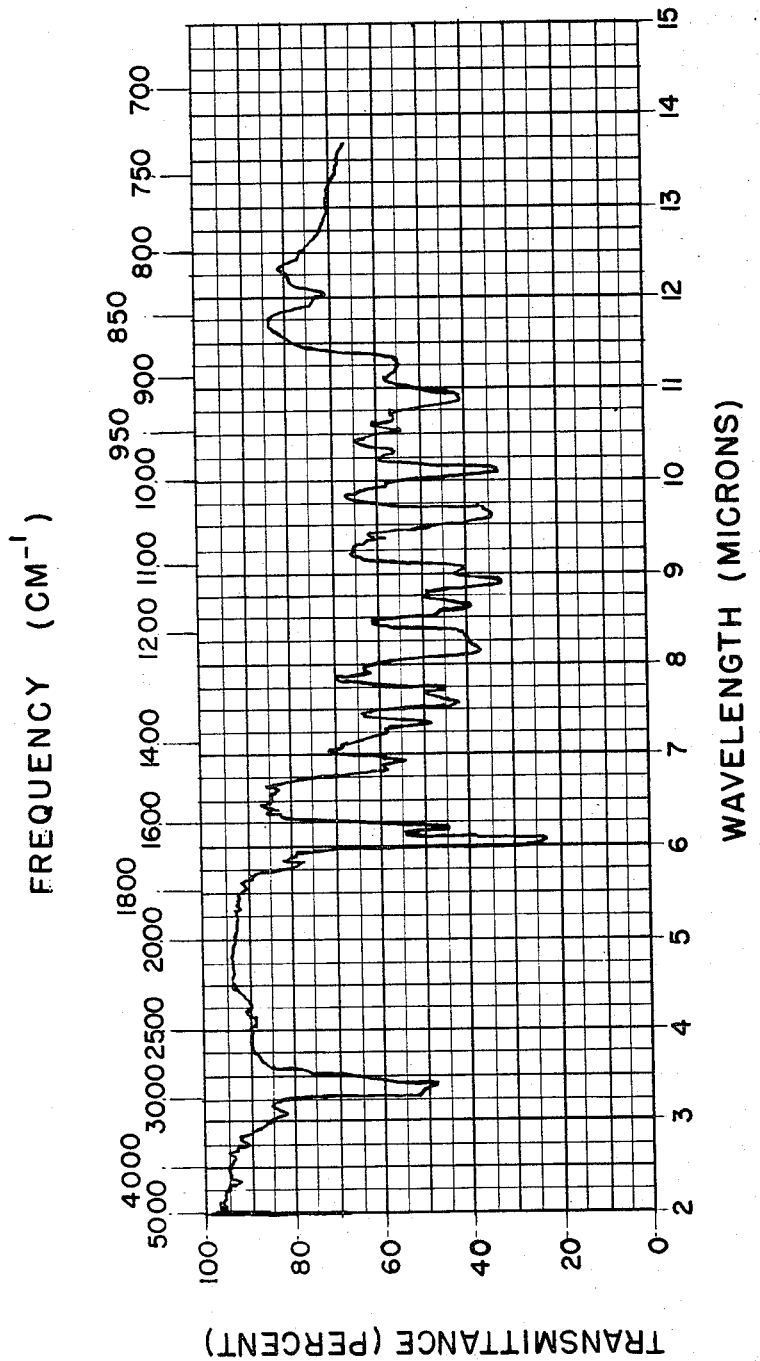

This invention relates to new antibiotics, to their production by fermentation, to methods for their recovery and concentration from crude solutions, to processes for their purification, and to methods for the preparation of the salts thereof.

The present invention includes within its scope the antibiotics in dilute forms, as crude concentrates and in pure forms. These novel products are active against a variety of microorganisms including gram-positive and gram-negative bacteria. The effects of the new antibiotics on specific microorganisms, together with the chemical and physical properties differentiate them from previously described antibiotics.

The new antibiotics which we have designated AP–191 antibiotics are formed during the cultivation under controlled conditions of a new strain of a species known as *Streptomyces candidus*. The fermentation mash has revealed the presence of three antibiotic components which have been designated AP–191–α, β and γ.

The following is a general description of the organism based on the diagnostic characteristics observed. The italicized descriptive colors are those of Ridgway (1912) "Color Standards and Color Nomenclature."

*Amount of growth.*—Moderate on most media.

*Aerial mycelium and/or en masse spore color.*—Aerial mycelium and spores white. Sporulation light to moderate on most media.

*Soluble pigment.*—No soluble pigments produced.

*Reverse color.*—In yellowish to light orange shades on most media.

*Miscellaneous physiological reactions.*—Nitrate reduced to nitrite after 14 days on synthetic nitrate broth but not on organic nitrate broth; complete liquefaction of gelatin in 14 days; melanin not produced on peptone-iron agar. Carbon source utilization according to Pridham et al. [J. Bact. 56:107–114 (1948)] as follows: Good to fair utilization of l-arabinose, d-mannitol, sucrose and dextrose; poor to non-utilization of d-xylose, adonitol, dextran, d-fructose, i-inositol, lactose, d-melezitose, d-melibiose, d-raffinose, l-rhamnose, salicin and de-trehalose.

*Morphology.*—Spores in long, straight to flexuous chains. Spores elongate 0.6–0.8µ x 1.0–1.4µ and smooth-walled as determined by electron microscopy.

When the taxonomic position of the new culture was traced in various systematic keys, it was found to be located in the group of white-spored Streptomycetes having uncomplicated straight to flexuous sporophores. Then when compared, according to these and other details, with the existing described species in this group, it most closely corresponded to the concept of *Streptomyces candidus*. Side by side comparison with reference specimens of *S. candidus* confirmed this identification. Hereafter, this isolate will be considered a strain of this species.

A viable culture of the new strain of *Streptomyces candidus* has been deposited with the Culture Collection Laboratory, Northern Utilization Research and Development Division, United States Department of Agriculture, Peoria, Ill., and has been added to its permanent collection as NRRL 3110.

A critical examination of the cultural, morphological and physiological characteristics of the new strain of *Streptomyces candidus* was made when grown on several media, including those recommended by Pridham et al. ["A Selection of Media for Maintenance and Taxonomic Study of Streptomyces," Antibiotics Annual (1956–1957), pages 947–953]. Detailed observations are set forth in Tables I, II, III and IV. The italicized descriptive colors are taken from Ridgway.

TABLE I.—CULTURAL CHARACTERISTICS OF *STREPTOMYCES CANDIDUS* NRRL 3110

[Incubation: 14 days; Temperature: 28° C.]

| Medium | Amount of Growth | Aerial Mycelium and/or Spores | Soluble Pigment | Reverse Color | Remarks |
|---|---|---|---|---|---|
| Czapek's Solution agar | Moderate; restricted. | Aerial mycelium and spores white; sporulation light. | None | *Cinnamon-Buff* | Colony surface lightly rhimose. |
| Tomato Paste agar | Moderate | Aerial mycelium and spores white; sporulation moderate. | do | *Ochraceous-Buff* | |
| Bennett's agar | do | do | do | *Honey Yellow* | |
| Asparagine dextrose agar | do | do | do | *Honey Yellow* | Lightly cracked and rhimose in limited areas of colonies. |
| Hickey and Tresner's agar | do | do | do | *Honey Yellow* | Do. |
| Carvajal's Oatmeal agar | Moderate; spreading. | do | do | *Honey Yellow* | Colony surface lightly wrinkled; cracked and rhimose in limited areas. |
| Potato dextrose agar | Moderate | do | do | *Ochraceous-Buff* | |
| Tomato paste-Oatmeal agar. | do | do | do | *Orange Buff* | Do. |
| Yeast Extract agar | do | do | do | *Ochraceous-Orange.* | |
| Inorganic Salts-Starch agar. | do | Aerial mycelium and spores white; sporulation light. | do | *Light Buff* | |
| Oat Flake agar | do | Aerial mycelium and spores white; sporulation moderate. | do | *Cinnamon Buff* | Colony surface lightly cracked and rhimose in limited areas. |

TABLE II.—MICROMORPHOLOGY OF STREPTOMYCES CANDIDUS NRRL 3110

| Medium | Aerial Mycelium and/or Sporiferous Structures | Spore Shape | Spore Size | Spore Surface |
|---|---|---|---|---|
| Hickey and Tresner's agar | Spores in long, straight to flexuous chains | Elongate; smooth | 0.6–0.8µ x 1.0–1.4µ | Smooth-walled as determined by electron microscopy. |

TABLE III.—MISCELLANEOUS PHYSIOLOGICAL REACTION OF STREPTOMYCES CANDIDUS NRRL 3110

[Temperature of incubation: 28° C.]

| Medium | Incubation Period | Amount of Growth | Physiological Reaction |
|---|---|---|---|
| Organic Nitrate Broth | 7 Days | Heavy | Nitrate not reduced. |
| Do | 14 Days | do | Do. |
| Synthetic Nitrate Broth | 7 Days | do | Do. |
| Do | 14 Days | do | Nitrite present. |
| Gelatin | 7 Days | do | Partial liquefaction. |
| Do | 14 Days | do | Complete liquefaction. |
| Iron-Peptone | 24 Hours | Moderate | No melanin produced. |

TABLE IV.—CARBON SOURCE UTILIZATION PATTERN OF STREPTOMYCES CANDIDUS NRRL 3110

[Incubation: 10 days; temperature: 28° C.]

Carbon source: Utilization [1]
- Adonital _____ 0
- l-Arabinose _____ 3
- Dextran _____ 0
- d-Fructose _____ 0
- i-Inositol _____ 0
- Lactose _____ 0
- d-Mannitol _____ 3
- d-Melezitose _____ 0
- d-Melibiose _____ 0
- d-Raffinose _____ 0
- l-Rhamnose _____ 0
- Salicin _____ 0
- Sucrose _____ 2
- d-Trehalose _____ 0
- d-Xylose _____ 1
- Dextrose _____ 2
- Negative control _____ 0

[1] 3=Good utilization; 2=Fair utilization; 1=Poor utilization; 0=No utilization.

It is to be understood that for the production of new antibiotics of this invention, the present invention is not limited to this particular organism or to organisms fully answering the above growth and microscopic characteristics which are given for illustrative purposes. In fact, it is desired and intended to include the use of mutants produced from the described organism by various means, such as X-radiation, ultraviolet radiation, nitrogen mustard, phage exposure and the like.

*The fermentation process*

The cultivation of the new strain of S. candidus NRRL 3110 may take place in a variety of liquid culture media. Media which are useful for the production of the new antibiotics include an assimilable source of carbon such as starch, sugar, molasses, glycerol, etc., an assimilable source of nitrogen such as protein, protein hydrolysate, polypeptides, amino acids, corn steep liquor, etc. and inorganic anions and cations, such as potassium, sodium, calcium, sulfate, phosphate, chloride, etc. Trace elements such as boron, molybdenum, copper, etc. are supplied as needed in the form of impurities by other constituents of the media. Aeration in tanks and bottles is provided by forcing sterile air through or onto the surface of the fermenting medium. Further agitation is provided in tanks, by a mechanical impeller. An antifoaming agent, such as 1% octadecanol in lard oil, may be added as needed.

*Inoculum preparation*

To prepare inoculum in shaker flasks, 100 milliliter portions of the following liquid medium in 500 milliliter flasks are inoculated with an agar slant of the culture.

Liquid medium: Grams per liter
- Soybean meal _____ 10
- Glucose _____ 20
- Corn steep liquor _____ 5
- Calcium carbonate _____ 3

The flasks are incubated at about 28° C. on a reciprocating shaker and agitated vigorously for 24 to 72 hours, usually for 48 hours.

*Tank fermentation*

For the production of the antibiotic in tank fermentors the following fermentation medium is preferably used.

Fermentation medium: Grams per liter
- Bactopeptone _____ 5
- Glucose _____ 10
- Molasses _____ 20

Each tank is inoculated with from 0.1 to 10% inclusive, of a culture broth fermented as described above for shaker flask inoculum preparation. Aeration is supplied at the rate of 0.2–2.0 volumes, inclusive, of sterile air per volume of broth per minute and the broth is agitated by an impeller driven at about 100–400 r.p.m. The temperature is maintained at 20–35° C., usually at 28° C. The fermentation may be continued for from 24–240 hours, at which time the mash is harvested.

*Recovery procedure*

After the fermentation is completed, the culture broth containing any of the three antibiotic components of this invention is preferably filtered at pH 7.3 to remove the mycelium from the broth. Diatomaceous earth or any of the conventional filtration aids may be used to assist the filtration which is carried out using standard equipment. Thereafter, the antibiotics may be recovered from the filtrate by appropriate extraction procedures.

When various crude preparations obtained from fermentation broths are subjected to paper chromatography in the system pyridine:chloroform:acetic acid:water 140:35:10:30 and the paper strips are bioautographed against *Bacillus subtilis*, three antibiotic components are found to recur, and these have been designated α ($R_f$ 0.85), β ($R_f$ 0.60) and γ ($R_f$ 0.40). The γ-component is present in every crude preparation studied. The α-component is absent in many preparations and is only a minor component when seen at all. The β-component is present in some fermentation samples but not all. The γ-component is the major component in all fermentations and in many fermentations it is the only antibiotic present.

For isolation of the AP–191 antibiotics from the fermentation mash the whole mash is filtered with the aid of diatomaceous earth. The filtrate at pH 9 is extracted with ethyl acetate; the ethyl acetate is concentrated over aqueous sulfuric acid and finally the antibiotics in the aqueous sulfuric acid solution are adsorbed on a mixture of activated carbon and diatomaceous earth or the like. The solids are washed with water, eluted with a mixture of acetone and water and the eluate is extracted with chloroform. The chloroform extracts are pooled, concentrated, washed with water and extracted with aqueous hydrochloric acid. The aqueous extracts are combined and lyophilized to yield the antibiotic hydrochloride salt as a yellow-green powder. The lyophilized hydrochloride salt is converted to the free base antibiotic by extraction from alkaline solution into chloroform and evaporation of the solvent in vacuo. These methods greatly purify any combination of AP–191 components produced by the fermentation.

In the case where only AP–191–γ exists the free base residue is further purified by precipitation from solutions of aqueous acetone. Preparations prepared in this way are used for the analytical determinations below.

Antibiotic AP–191–γ free base is composed of the elements carbon, hydrogen, nitrogen and oxygen in substantially the following average percentages by weight:

| | Percent |
|---|---|
| Carbon | 61.54 |
| Hydrogen | 7.27 |
| Nitrogen | 7.22 |
| Oxygen (by difference) | 23.97 |

The antibiotic darkens without melting above 200° C. and has an optical rotation $[\alpha]_D^{25°} = -116°$ (c.=0.516, chloroform). The free base antibiotic is soluble in chloroform, partly soluble in acetone and ethyl acetate, slightly soluble in alcohols and water and insoluble in alkanes. It is also relatively stable to acidic conditions but quite labile to alkaline conditions.

The antibiotic exhibits characteristic absorption in the ultraviolet region of the spectrum, in $2.5 \times 10^{-4}$ N HCl as follows: λ max 271 mμ

$$(E_{1cm}^{1\%} = 212)$$

with λ340 mμ

$$(E_{1cm}^{1\%} = 17)$$

shoulder.

An infrared absorption spectrum of AP–191–γ free base in chloroform solution is obtained in a standard manner. The compound exhibits major absorptions in the infrared region of the spectrum at the following wave-lengths expressed in microns: 3.40, 6.04, 6.17, 6.91, 7.30, 7.57, 7.72, 8.10–8.30, 8.67, 8.90, 9.10, 9.57, 9.68, 10.09 and 10.88. The infrared curve is shown in FIGURE 1 of the accompanying drawings.

A proton magnetic resonance spectrum of AP–191–γ is determined with a Varian A–60 spectrometer at 60 megacycles in the customary manner by dissolving in deuterochloroform containing tetramethylsilane and chloroform as internal standards. The compound has a characteristic resonance pattern with principal features occurring at the following fractions expressed in δ (delta) units parts per million: 1.18, 1.33, 1.90, 2.07, 2.65, 3.95 and 4.83. The resonance spectrum is shown in FIGURE 2 of the accompanying drawings.

Antibiotic AP–191–γ is clearly distinguished from other antibiotics by the characterization data given above and by its antimicrobial spectrum. The specific antimicrobial activity of AP–191–γ is presented in the following table which shows the concentration required to inhibit the growth of representative microorganisms as determined by the agar dilution streak method.

TABLE V.—MINIMAL INHIBITORY ANTIBACTERIAL SPECTRUM OF AP–191–γ

| Organism: | MIC (mcg.[1]/ml.) |
|---|---|
| Bacillus subtilis (ATCC 6633) | 0.05 |
| Escherichia coli (ATCC 9637) | 1.6 |
| Mycobacterium smegmatis (ATCC 607) | 6.2 |
| Proteus vulgaris (ATCC 9484) | 0.4 |
| Pseudomonas fluorescens (ATCC 12633) | 1.6 |
| Salmonella gallinarum (Lederle An. Ind. 604) | 0.8 |
| Sarcina lutea (ATCC 9341) | 0.04 |
| Staphylococcus aureus (ATCC 6548P) | 0.2 |
| Staphylococcus aureus (Lederle 4050B–122–3) | 0.15 |
| Staphylococcus aureus (Lederle 4050B–122–7) | 0.08 |
| Staphylococcus aureus (Lederle 4050B–122–9) | 0.15 |
| Staphylococcus aureaus (Lederle 4050B–122–10) | 0.15 |
| Staphylococcus aureus (Lederle 4050B–122–11) | 0.15 |
| Staphylococcus aureus (Lederle 4050B–122–13) | 0.15 |
| Staphylococcus aureus (Lederle 4050B–122–14) | 0.15 |
| Staphylococcus aureus (Rose ATCC 14154) | 0.15 |
| Staphylococcus aureus (Smith) | 0.04 |
| Streptococcus faecalis (ATCC 8043) | 0.3 |
| Streptococcus pyogenes (C203) | <0.005 |
| Staphylococcus aureus (Lederle 4053B–40–1) | 0.01 |
| Streptococcus pyogenes (Lederle 8053B–40–2) | 0.01 |
| Streptococcus pyogenes (Lederle 8053B–40–3) | 0.01 |
| Streptococcus pyogenes (NY5) | <0.005 |
| Streptococcus sp. γ-Strep. 11 | 5.0 |
| Streptococcus sp. β-Strep. 80 | 2.5 |

[1] By agar dilution-stretch method.

AP–191–γ is active against gram-negative and gram-positive microorganisms, such as staphylococci and streptococci. The new antibiotic is thus potentially useful as a therapeutic agent in treating bacterial infections in humans and animals caused by such microorganisms. The new antibiotic can be expected to be usefully employed for controlling such infections by topical application or parenteral administration.

The usefulness of the novel antibiotic is demonstrated by its ability to control systemic lethal infections in mice. AP–191–γ shows antibacterial in vivo activity in mice when tested orally and subcutaneously against Staphylococcus aureus and Streptococcus pyogenes C–203 in mice. The antibiotic is active when administered in a single subcutaneous or oral dose to groups of Carworth Farms CF 1 female mice, weight 18–21 grams, infected by intraperitoneal injection with a lethal dose of $10^{-5}$ trypticase soy broth dilution of a five-hour blood broth culture of Streptococcus pyogenes, β-hemolytic strain C–203. The results are shown in the following table. Although the novel antibiotic has not as yet been clinically demonstrated to be useful in human therapy, the results of the tests in mice against human pathogens show a high probability of useful activity in humans.

TABLE VI.—IN VIVO ANTIBACTERIAL ACTIVITY OF ANTIBIOTIC AP-191-γ

| Single Dose, mg./kg. | No. Mice Alive/No. Mice Tested—14 Days Post Infection | |
|---|---|---|
|  | Single Subcutaneous Dose | Single Oral Dose |
| 80 |  | 17/20 (85%) |
| 40 |  | 17/20 (85%) |
| 20 |  | 15/20 (75%) |
| 10 |  | 15/20 (75%) |
| 5 |  | 12/20 (60%) |
| 2.5 | 20/20 (100%) | 6/20 (30%) |
| 1.25 | 20/20 (100%) | 0/10 (0%) |
| 0.63 | 17/20 (85%) |  |
| 0.32 | 16/20 (80%) |  |
| 0.16 | 4/20 (20%) |  |
| 0.08 | 3/20 (15%) |  |
| 0.04 | 0/10 (0%) |  |

The invention will be described in greater detail in conjunction with the following specific examples.

EXAMPLE 1.—INOCULUM PREPARATION

A typical medium used to grow the primary inoculum is prepared according to the following formula:

|  | Grams |
|---|---|
| Soybean meal | 10 |
| Glucose | 20 |
| Corn steep liquor | 5 |
| Calcium carbonate | 3 |
| Water to 1000 milliliters. |  |

A yeast-malt agar slant of *S. candidus* NRRL 3110 is incubated for a week. At this time the spores and mycelium are transferred to two 500 milliliter flasks which contain 100 milliliters of the above medium. The flasks are placed on a reciprocating shaker and agitated vigorously for 48 hours at 28° C. At the end of this time, the flask inocula are used to seed a five gallon glass fermentor containing 12 liters of medium.

EXAMPLE 2.—FERMENTATION

A fermentation medium is prepared according to the following formula:

| Bactopeptone, grams | 5 |
|---|---|
| Glucose, grams | 10 |
| Molasses, grams | 20 |
| Calcium carbonate, gram | 1 |
| Water, liter | 1 |

Twelve liters of the above medium is placed in a five gallon glass fermentor and sterilized in an autoclave with steam pressure at 120° C. for 30 minutes. The pH of the medium is about pH 7.0 before sterilization and after sterilization is about pH 7.1. The medium is then inoculated with 200 milliliters of a 2-day inoculum described in Example 1. The fermentation is agitated by an impeller operating at 400 revolutions per minute, and aerated at a rate of 0.325 c.f.m. The temperature during the course of the fermentation is between 26° C. and 28° C. The fermentation is harvested at approximately 68 hours after inoculation.

EXAMPLE 3.—ISOLATION OF AP-191 ANTIBIOTICS AS THE HYDROCHLORIDE SALT FROM FERMENTATION MASH

The whole mash is filtered with the aid of diatomaceous earth. A 2150 liter portion of the filtrate is extracted with ethyl acetate at pH 9 to obtain 1750 liters of ethyl acetate extract, which is concentrated over 30 liters of aqueous sulfuric acid at pH 3 to a final aqueous concentrate of 16 liters. The antibiotics are adsorbed from the aqueous concentrate by batchwise adsorption on 600 g. of Darco and 1200 g. of diatomaceous earth. The solids are washed with water, then eluted with 18 liters of 1:9 acetone:water, and the eluate is extracted at pH 9 with three 3-liter portions of chloroform. The chloroform extracts are pooled, concentrated, washed with water at pH 8.8 and extracted with two 250 ml. portions of aqueous hydrochloric acid at pH 4.0. The aqueous extracts are combined and lyophilized to yield 3.6 g. of a yellow-green powder.

EXAMPLE 4.—PURIFICATION OF AP-191-γ

4.0 g. of crude AP-191-γ hydrochloride salt prepared by the method of Example 3 and selected to be free of α and β is dissolved in 50 ml. of water and 50 ml. of chloroform is added. The pH is adjusted to 8.5 by titration while stirring with 0.50 N sodium hydroxide (neutral equivalent weight=333 by this titration). The layers are separated, and the aqueous phase is re-extracted with an additional 50 ml. of chloroform. The chloroform extracts are combined and evaporated in vacuo to yield 3.5 g. of a yellow residue, AP-191-γ free base. Analytical samples of the free base are prepared by dissolving material thus obtained in acetone, slowly adding water until cloudiness appears, then adding sufficient acetone to clear the solution. On allowing the solution to stand at 5° C. to evaporate slowly or on evaporating the solution under a jet of compressed air, a yellow precipitate of purified AP-191-γ free base results. The physical, chemical and biological properties of this component as the free base have already been described.

We claim:
1. A substance selected from the group consisting of antibiotic AP-191-γ effective in inhibiting the growth of gram-positive and gram-negative bacteria, the free base of which is characterized by the following properties:
  (a) readily soluble in chloroform, partly soluble in acetone and ethyl acetate, slightly soluble in alcohols and water and insoluble in alkanes, relatively stable to acidic conditions and labile to alkaline conditions,
  (b) having an optical rotation $[\alpha]_D^{25°} = -116°$ (C.=0.516, chloroform),
  (c) containing the elements carbon, hydrogen, nitrogen and oxygen in substantially the following average percentages by weight:

| Carbon | 61.54 |
|---|---|
| Hydrogen | 7.27 |
| Nitrogen | 7.22 |
| Oxygen (by difference) | 23.97 |

(d) characteristic absorption in the ultraviolet region of the spectrum in $2.5 \times 10^{-4}$ N HCl: $\lambda_{max.}$ 271 mμ

$$(E_{1\,cm.}^{1\%} = 212)$$

with λ340 mμ

$$(E_{1\,cm.}^{1\%} = 17)$$

shoulder,
  (e) characteristic absorption in the infrared region of the spectrum as shown in FIGURE 1, and
  (f) a proton resonance spectrum as shown in FIGURE 2 and the salts thereof.

2. A process for the production of antibiotic AP-191-γ which comprises cultivating *Streptomyces candidus* NRRL 3110 in an aqueous nutrient medium containing assimilable sources of carbohydrate, nitrogen and inorganic salts under submerged aerobic conditions for a period of from 24 to 240 hours and at a temperature of 20 to 35° C., and recovering the antibiotics so-produced.

References Cited

UNITED STATES PATENTS 3,126,317  3/1964  Heinemann et al. _____ 167—65

ALBERT T. MEYERS, *Primary Examiner.*

D. M. STEPHENS, *Assistant Examiner.*